(12) United States Patent
Carlucci et al.

(10) Patent No.: US 10,184,348 B2
(45) Date of Patent: Jan. 22, 2019

(54) SYSTEM AND METHOD FOR TURBINE BLADE CLEARANCE CONTROL

(71) Applicant: HONEYWELL INTERNATIONAL INC., Morristown, NJ (US)

(72) Inventors: Gregory C. Carlucci, Phoenix, AZ (US); Glenn Alexander Knight, Derbyshire (GB); Jim Rumbo, Phoenix, AZ (US); Dennis D Loots, Scottsdale, AZ (US); Roger Peckham, Glendale, AZ (US); Marko Bacic, Oxford (GB); James Kenneth Haberstock, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1262 days.

(21) Appl. No.: 14/097,462

(22) Filed: Dec. 5, 2013

(65) Prior Publication Data

US 2015/0159500 A1 Jun. 11, 2015

(51) Int. Cl.
F01D 11/24 (2006.01)
F01D 11/20 (2006.01)
F02C 9/00 (2006.01)

(52) U.S. Cl.
CPC .............. F01D 11/24 (2013.01); F01D 11/20 (2013.01); F02C 9/00 (2013.01); F05D 2270/07 (2013.01); F05D 2270/44 (2013.01)

(58) Field of Classification Search
CPC .......... F01D 11/20; F01D 11/22; F01D 11/24; F05D 2270/051; F05D 2270/07;
(Continued)

(56) References Cited

U.S. PATENT DOCUMENTS 4,205,814 A 6/1980 Larson et al.
4,329,114 A 5/1982 Johnston et al.
(Continued)

FOREIGN PATENT DOCUMENTS

GB 668434 3/1952
GB 2233399 A1 1/1991
(Continued)

OTHER PUBLICATIONS

Steinetz, B. M., et al.; Evaluation of an Active Clearance Control System Concept, NASA/TM—2005-213856; AIAA-2005-3989, Nov. 2005.
(Continued)

Primary Examiner — Jason Shanske
Assistant Examiner — Jesse Prager
(74) Attorney, Agent, or Firm — Lorenz & Kopf, LLP

(57) ABSTRACT

A system and method are provided for controlling turbine blade tip-to-static structure clearance in a gas turbine engine installed on an aircraft. Mode control data are processed to determine that a fuel-saving mode is enabled, and aircraft data are processed to determine that the aircraft gas turbine engine is generating a substantially constant thrust. The turbine blade tip-to-static structure clearance in the aircraft gas turbine engine is minimized upon determining that both the aircraft gas turbine engine is generating a substantially constant thrust and the fuel-saving mode is enabled. The turbine blade tip-to-static structure clearance in the aircraft gas turbine engine is then selectively increased to a predetermined clearance, and a change in aircraft gas turbine engine thrust is prevented until the predetermined clearance is achieved.

14 Claims, 4 Drawing Sheets

(58) Field of Classification Search
CPC ........... F05D 2270/30; F05D 2270/335; F05D 2270/44; F02C 9/00
See application file for complete search history.

(56) References Cited

U.S. PATENT DOCUMENTS

| | | | |
|---|---|---|---|
| 4,632,635 | A | 12/1986 | Thoman et al. |
| 4,912,642 | A * | 3/1990 | Larsen ................. F02C 9/28 244/182 |
| 5,005,352 | A | 4/1991 | Schwarz et al. |
| 5,048,288 | A | 9/1991 | Bessette et al. |
| 5,076,050 | A | 12/1991 | Schwarz et al. |
| 5,090,193 | A | 2/1992 | Schwarz et al. |
| 6,063,129 | A | 5/2000 | Dadd et al. |
| 6,273,671 | B1 | 8/2001 | Ress, Jr. |
| 7,431,557 | B2 | 10/2008 | Herron et al. |
| 8,126,628 | B2 | 2/2012 | Hershey et al. |
| 8,296,037 | B2 * | 10/2012 | Plunkett ............... F01D 11/20 60/782 |
| 2009/0037035 | A1 | 2/2009 | Hershey et al. |
| 2009/0319150 | A1 * | 12/2009 | Plunkett ............... F01D 11/20 701/100 |
| 2013/0054055 | A1 | 2/2013 | Mathews, Jr. et al. |
| 2014/0058644 | A1 | 2/2014 | Adibhatla et al. |

FOREIGN PATENT DOCUMENTS

| | | |
|---|---|---|
| GB | 2460948 A1 | 12/2009 |
| JP | 2013139821 A1 | 7/2013 |

OTHER PUBLICATIONS

Steinetz, B.M., et al.; Preliminary Evaluation of an Active Clearance Control System Concept; 41st AIAA/ASME/SAE/ASEE Joint Propulsion Conference & Exhibit Jul. 10-13, 2005, Tucson, AZ.
EP Extended Search Report for Application No. 14192576.8 dated May 6, 2015.
EP Examination Report for Application No. 14192576.8 dated Jan. 10, 2017.
CN Office Action and Search Report for Application No. 201410726067.3 dated Apr. 12, 2017.

* cited by examiner

SYSTEM AND METHOD FOR TURBINE BLADE CLEARANCE CONTROL

TECHNICAL FIELD

The present invention generally relates to gas turbine engines, and more particularly relates to turbine blade clearance control.

BACKGROUND

For gas turbine engines, it is generally known that the operational clearances between static engine structures and the tips of rotating blades impact the thermodynamic efficiency and fuel burn (e.g., specific fuel consumption or SFC) of the engine. Hence, gas turbine engine manufacturers continually seek ways to reduce these operational clearances, while at the same time avoiding rubs between the rotating blade tips and the static structure. The value of even several thousandths of an inch improvement can be quite significant.

Unfortunately, the lengths of the blade tips typically vary at a different rate than the static structures can expand or contract to accommodate the change in blade tip length, especially during transient operations. This can result in the blade tips contacting the static structure or cause excess clearance between the blade tips and static structure, both of which can reduce engine performance. One method that has been implemented to match the different growth rates is to supply a flow of air from the engine onto various rotor and/or static structures to reduce the operational clearances during steady state, high altitude cruise conditions. However, if a change in engine thrust is commanded while the operational clearances are reduced, rubs can unavoidably occur, resulting in damage and/or reduced engine performance.

Hence, there is a need for a system and method of controlling turbine blade clearances so that rubs between turbine blade tips and static structures is eliminated (or at least reduced) as a result of engine thrust level changes. The present invention addresses at least this need.

BRIEF SUMMARY

In one embodiment, a method of controlling turbine blade tip-to-static structure clearance in a gas turbine engine installed on an aircraft includes processing mode control data to determine that a fuel-saving mode is enabled, and processing aircraft data to determine that the aircraft gas turbine engine is generating a substantially constant thrust. The turbine blade tip-to-static structure clearance in the aircraft gas turbine engine is minimized upon determining that both the aircraft gas turbine engine is generating a substantially constant thrust and the fuel-saving mode is enabled. The turbine blade tip-to-static structure clearance in the aircraft gas turbine engine is then selectively increased to a predetermined clearance, and change in aircraft gas turbine engine thrust is prevented until the predetermined clearance is achieved.

In another embodiment, a turbine blade tip-to-static structure clearance control system includes an aircraft gas turbine engine and a control system. The aircraft gas turbine engine is configured to generate a thrust, and includes a turbine section that includes a plurality of turbine blades surrounded by static structure. Each turbine blade has a turbine blade tip that is spaced apart from the static structure by a turbine blade tip-to-static structure clearance. The control system is in operable communication with the aircraft gas turbine engine and is configured to control the turbine blade tip-to-static structure clearance in the aircraft gas turbine engine, determine that a fuel-saving mode is enabled, determine that the aircraft gas turbine engine is generating a substantially constant thrust, minimize the turbine blade tip-to-static structure clearance in the aircraft gas turbine engine upon determining that (i) the aircraft gas turbine engine is generating a substantially constant thrust and (ii) the fuel-saving mode is disabled, and selectively (i) increase the turbine blade tip-to-static structure clearance in the aircraft gas turbine engine to a predetermined clearance and (ii) prevent a change in aircraft gas turbine engine thrust until the predetermined clearance is achieved.

In yet another embodiment, a method of controlling turbine blade tip-to-static structure clearance in a gas turbine engine installed on an aircraft includes processing aircraft data to determine that the aircraft gas turbine engine is generating a substantially constant thrust. When the aircraft gas turbine engine is generating a substantially constant thrust, limiting throttle changes in the aircraft gas turbine engine to a predetermined throttle rate limit, the predetermined throttle rate limit based on individual characteristics of the gas turbine engine.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
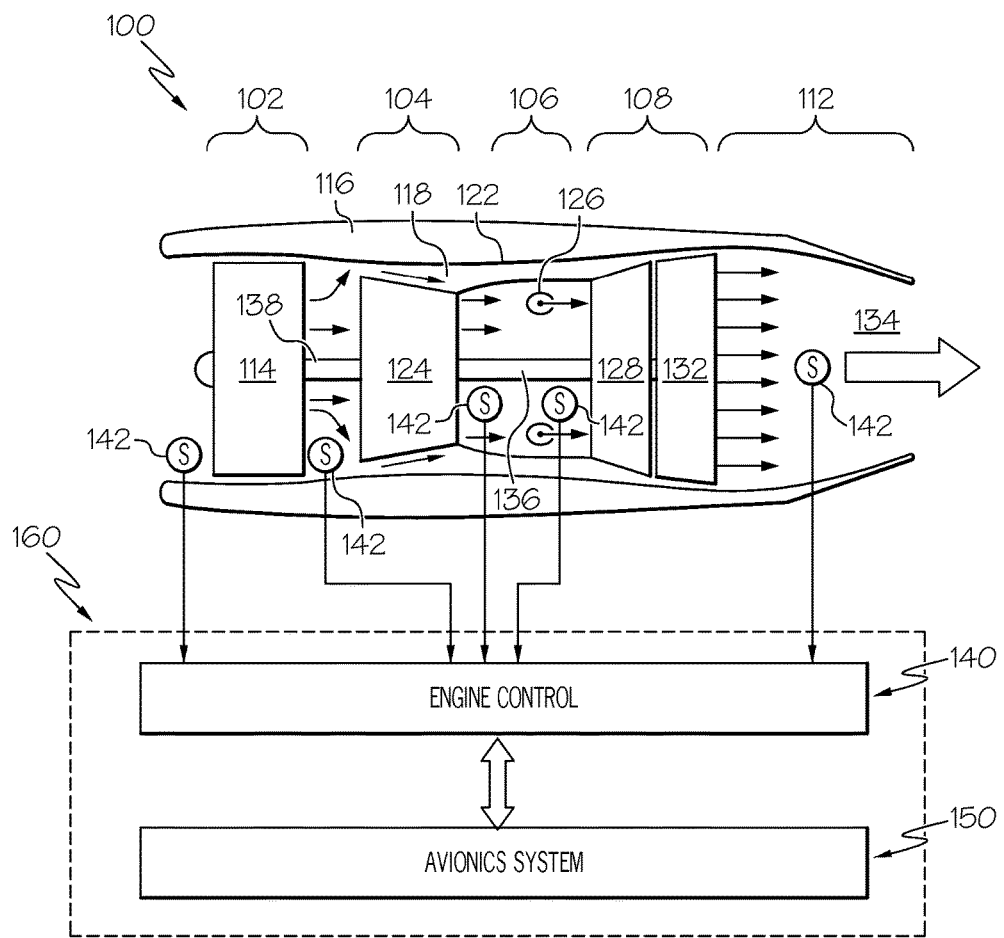
FIG. 1 depicts a functional block diagram of an exemplary gas turbine engine.

Referring first to FIG. 1, a functional block diagram of an exemplary gas turbine engine is depicted. The depicted engine 100 is a multi-spool turbofan gas turbine aircraft propulsion engine, and includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through a propulsion nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

The operation of the engine 100 is controlled via a control system 160. In the depicted embodiment, the control system 160 includes an engine control 140 and an aircraft avionics system 150. Each of which will be separately described, beginning first with the engine control 140. Before doing so, however, it will be noted that one or more (or even all) of the functions described herein as being implemented in the engine control 140 could instead be implemented in the avionics system 150, and vice-versa. Moreover, one or more (or even all) of the functions implemented in the engine control 140 and/or avionics system 150 could be implemented in one or more other systems or sub-systems, as needed or desired.

The engine control 140 may be variously implemented. For example, it may be implemented as any one of numerous electronic engine controllers (EECs), as any one of numerous engine control units (ECUs), as a Full-Authority Digital Engine Controller (FADEC), or as any one of numerous electro-mechanical engine controls, just to name a few non-limiting examples. Regardless of the implementation, the engine control 140 is configured, among other things, to control the propulsion thrust generated by the engine 100 by, for example, controlling fuel flow rate to the engine 100. In the depicted embodiment, the engine control 140 receives, for example, a throttle position signal from one of a plurality of sources, which are discussed in more detail further below. The engine control 140 also receives sensor signals from a plurality of sensors 142 that are disposed at various locations on and within the engine 100. The sensors 142 are used to sense various operational parameters associated with the engine such as, for example, various temperatures, speeds, and air flow, and supply signals representative of the sensed parameters to the engine control 140. The engine control 140 processes the signals received from the throttle position signal and the sensor signals and, among other things, supplies various commands to the engine 100 to control the generated propulsion thrust.

Figure 2:
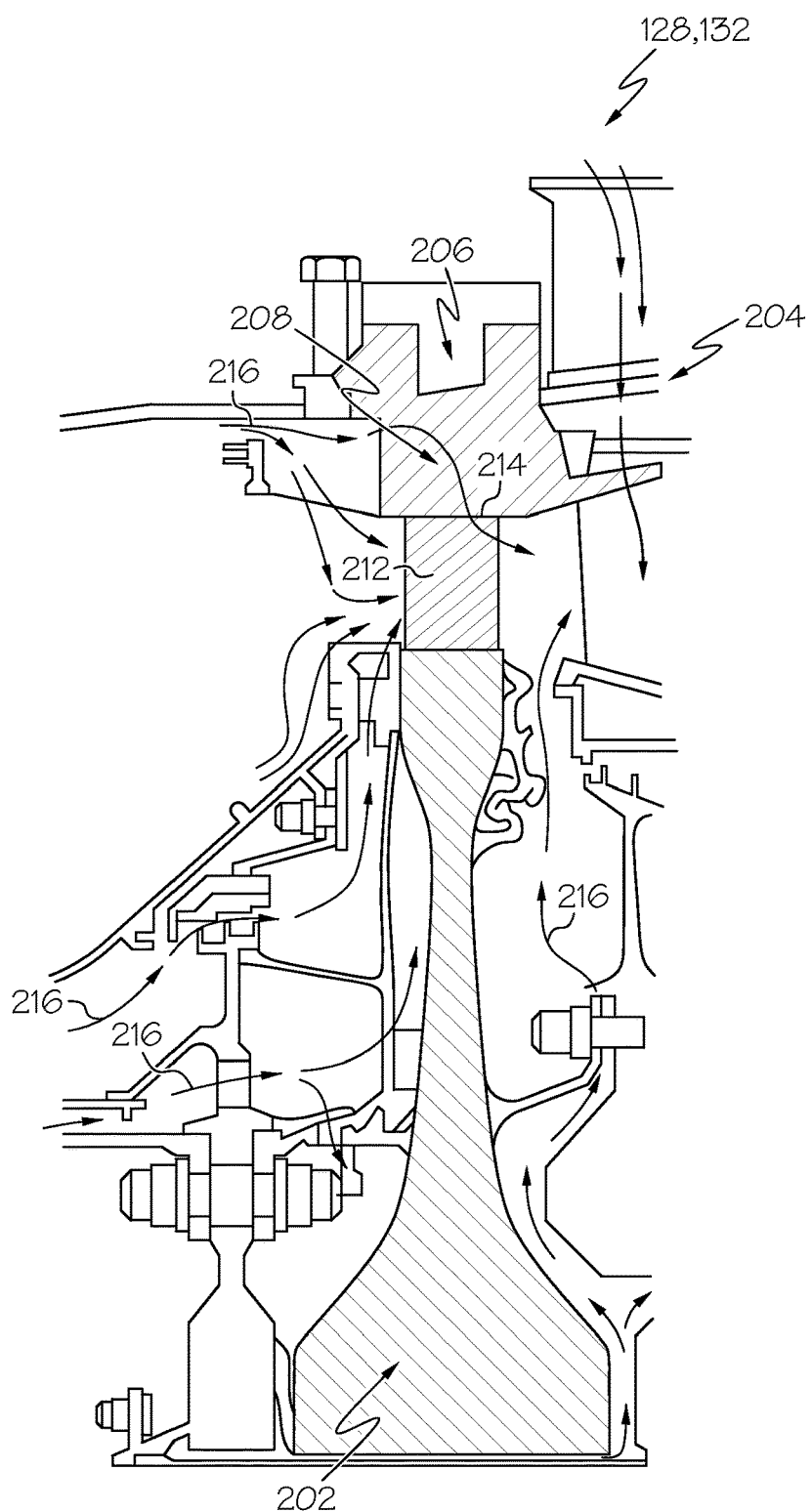
FIG. 2 depicts a cross section view of a portion of a turbine that may be used to implement the engine of FIG. 1.

In addition to controlling the propulsion thrust that is generated by the engine 100, the engine control 140 is configured to control the turbine blade tip-to-static structure clearance in the engine 100. This is because the operational clearances between static engine structures and the tips of rotating turbine blades impact the thermodynamic efficiency and specific fuel consumption (SFC) of the engine 100. In particular, and reference now to FIG. 2, a cross section view of a portion of one of the turbines 128 or 132 is depicted. The depicted turbine, whether it is the high pressure turbine 128 or the low pressure turbine 132, includes a rotationally mounted rotor 202 and various static structures 204, such as a turbine case 206 and a shroud 208. As is generally known, the rotor 202 has a plurality of turbine blades 212 (only one shown) coupled thereto. Each turbine blade 212 extends radially outward to a turbine blade tip 214 that is spaced apart from the static structure 202, in this case the shroud 208, by a clearance that is referred to herein as "the turbine blade tip-to-static structure clearance."

The turbine blade tip-to-static structure clearance may be selectively controlled by modulating a flow of cooling air 216 to portions of the rotor 202 and/or static structures 204. In the depicted embodiment, cooling air 216 is supplied to both the rotor 202 and static structures 204, but in other embodiments the cooling air 216 may be supplied to only the rotor 202 or to only the static structures 204. The source of the cooling air 216 may also vary, but is typically bleed air from the engine compressor section 104. It would be preferable to be able to controllably maintain the turbine blade tip-to-static structure clearance at a minimum clearance value throughout engine operations, including transient operations. Unfortunately, the lengths of the blade tips 214 typically vary at a different rate than the static structures 204 can expand or contract. Thus, the engine control 140, either alone or together with portions of the aircraft avionics system 150, which will be described in more detail momentarily, implements a method to control the turbine blade tip-to-static structure clearance in such a manner that turbine blade rubs are prevented (or at least substantially minimized) during engine thrust transients. This method will also be described in more detail momentarily. Before doing so, however, portions of the aircraft avionics system 150 will now be described in more detail.

Figure 3:
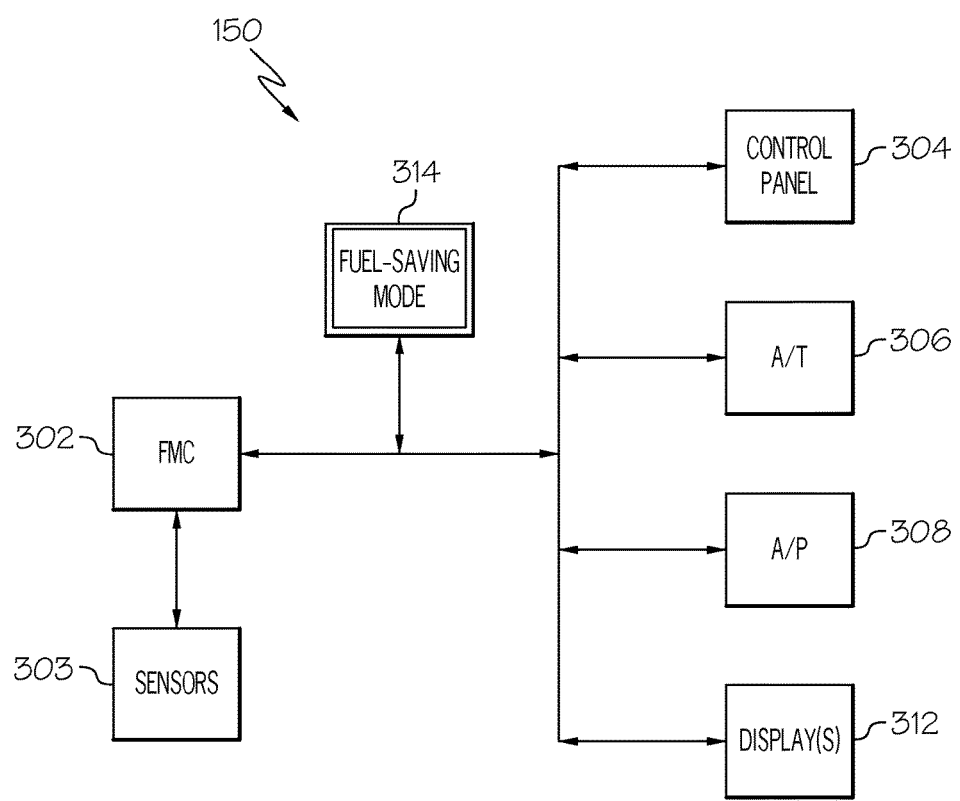
FIG. 3 depicts a functional block diagram of one embodiment of an avionics system.

The avionics system 150 is in operable communication with the engine control 140. A functional block diagram of one non-limiting embodiment of the avionics system 150 is depicted in FIG. 3. Although the avionics system 150 may be variously configured and implemented, in the depicted embodiment the avionics system 150 includes a flight management computer (FMC) 302, a control panel 304, such as a mode control panel (MCP) or a flight control unit (FCU), an auto-throttle (A/T) 306, an auto-pilot (A/P) 308, and one or more displays 312. The FMC 302 is configured to receive input from a user, such as a flight plan from a pilot, and generate detailed flight instructions for flying the aircraft in accordance with the flight plan. As FIG. 3 also depicts, to assist in implementing this function, the FMC 302 is coupled to receive sensor data from various flight-related sensors 303 (e.g., inertial sensors, altitude sensors, attitude sensors, global positioning system (GPS), just to name a few).

The control panel 304 is in operable communication with the FMC 302 and is configured, to allow a user (e.g., a pilot)

to select which portions the flight plan that will be controlled automatically. For example, the control panel 304 may include one or more user interfaces (e.g., switches, knobs, etc.) that allow the pilot to selectively activate and inactivate the A/T 306, and to selectively activate and inactivate all or portions of the A/P 308. For example, the control panel 304 may be configured to allow the pilot to select lateral and vertical control modes for the A/P 308, and to input various parameters such as, for example, heading, speed, vertical speed, and flight level/altitude. The control panel 304 may be configured to instruct the A/P 308 to follow the flight plan generated by the FMC 302, to hold a specific altitude, to change altitudes at a specific rate, to hold a specific heading, to turn to a new heading, to hold a specific aircraft speed, to change to a new speed, and so on. When the A/T 306 is activated, it interfaces with the engine control 140 to control the thrust generated by engine 100.

The displays 312 are in operable communication with the FMC 302 and may be variously configured and implemented. For example, the displays 312 may be configured and implemented as one or more primary flight displays (PFDs), one or more multi-function control display units (MCDUs), or any one of numerous user interface devices. The functions of these displays 312 is generally well known and will not be further described herein.

As FIG. 3 also illustrates, the depicted avionics system 150 additionally includes a fuel-saving mode enabler 314. This enabler 314, which may be variously implemented and located, is configured to supply mode control data representative of its position to the avionics system 150. For example, it may be implemented as a knob, a switch, a touchscreen interface, or as a software function, just to name a few. Moreover, it may be physically located on the control panel 304, on one or more of the displays 312, or separate from these devices. Alternatively, as already alluded to, the fuel-saving mode enabler 314 may be implemented in software. Regardless of its implementation or location, the fuel-saving mode enabler 314 allows a pilot (or software) to selectively enable and disable what is referred to herein as a "fuel-saving mode."

When the fuel saving mode is disabled, the engine control 140 will control the cooling air flow 216 so that the turbine blade tip-to-static structure clearance is at a predetermined value that will ensure blade rubs do not occur. Conversely, when the fuel-saving mode is enabled, the engine control 140 will, under certain circumstances that are described below, control the cooling air flow 216 to minimize turbine blade tip-to-static structure clearance. In addition to minimizing the blade tip-to-static structure clearance, the engine control 140 is configured, when the fuel-saving mode is enabled, to limit thrust changes in the gas turbine engine 100 to a predetermined thrust rate limit. This predetermined thrust rate limit is preferably based on the individual characteristics of the gas turbine engine 100, though in some embodiments it could be based on the general characteristics of an entire engine model.

As was previously noted, the control system 160, via the engine control 140 or the engine control 140 and the avionics system 150 in combination, implements a method to control the turbine blade tip-to-static structure clearance in such a manner that turbine blade rubs are prevented (or at least substantially minimized) during engine thrust change transients. The general method 400 is depicted in flowchart form in FIG. 4, and with reference thereto will be described in more detail. Before doing so, however, it is noted that the following discussion is based on certain functions being implemented in the engine control 140 and others being implemented in the avionics system 150. It will be appreciated that this is merely exemplary, and that one or all of the functions described as being implemented in the engine control 140 could be implemented in the avionics system 150, and vice-versa.

Figure 4:
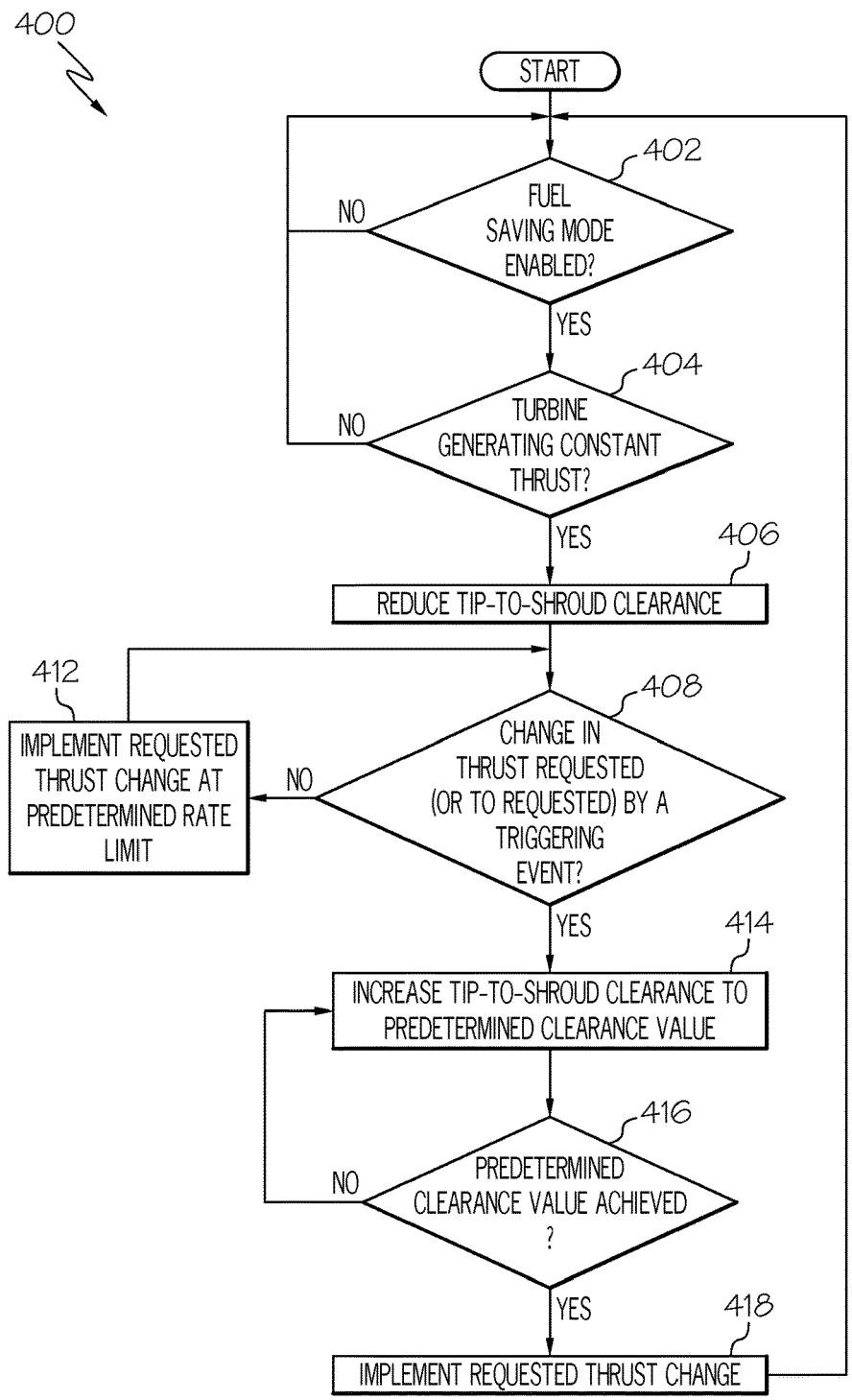
FIG. 4 depicts one embodiment of a method, in flowchart form, of controlling the turbine blade tip-to-static structure clearance in the engine of FIG. 1.

Turning now to FIG. 4, the general method 400 begins by the avionics system 150 processing the mode control data supplied from the fuel-saving mode enabler 314 to determine if the fuel-saving mode is enabled (402). If not, then no further processing is needed. If the fuel-saving mode is enabled, the avionics system 150 processes various aircraft data to determine if the gas turbine engine 100 is generating a substantially constant thrust (404).

The avionics system 150, and the data used by the avionics system 150, to determine if the gas turbine engine 100 is generating a substantially constant thrust may vary. In the depicted embodiment, however, these data include the status of the A/T 306, aircraft speed, and the status of the level flight and stable speed capability of the A/P 308. More specifically, the avionics system 150, based on these data, determines if the A/T 306 is activated, if the aircraft speed is substantially constant (e.g., ±some predetermined deadband speed), and if level flight capability is engaged on the control panel 304. In the depicted embodiment, if at least these conditions are true, and the fuel-saving mode is enabled, then the avionics system 150 supplies clearance control mode signal to the engine control 140. The engine control 140, in response to this signal, minimizes the turbine blade tip-to-static structure clearance (406).

As may be appreciated, the particular turbine blade tip-to-static structure clearance value that corresponds to the "minimum" may vary from engine to engine, and under differing operating conditions. The minimum value is selected to optimize thermodynamic efficiency and fuel burn (e.g., SFC). Preferably, a model (or other representative data) of the gas turbine engine 100 may be stored in memory in the engine control 140, the avionics system 150, or both. The model may also be downloaded from an external device or system into the engine control 140, the avionics system 150, or both. If downloaded to only one of the engine control 140 or the avionics system 150, the model may be transferred between these systems/devices, as needed. The stored model (or data) may be selectively retrieved to determine the minimum clearance value, as well as the response characteristics of the engine 100.

When the turbine blade tip-to-static structure clearance is minimized, the engine control system 160 will either limit engine thrust level changes to a predetermined rate limit or increase the turbine blade tip-to-static structure clearance to a predetermined clearance value and then implement the thrust level change. More specifically, the control system 160 determines whether a change in engine thrust is, or will be, requested by a triggering event (408). A triggering event, as this term is used herein, is an event for which it may be undesirable to limit engine thrust level changes to the predetermined rate limit. The triggering events, and the manner in which the control system 160 determines that a change in thrust is (or will be) requested by a triggering event, may vary, and will be described momentarily. First, the process that is implemented when the control system 160 determines that a change in engine thrust is not, or will not be, requested by a triggering event will be described.

If the change in thrust is not (or will not be) requested by a triggering event, then the control system 160 limits the requested engine thrust level change to the predetermined rate limit (412). The control system 160 may be variously configured to implement this functionality, but in the depicted embodiment the control system 160 implements an algorithm to minimize aircraft speed errors that may be caused, for example, by various environmental factors (e.g., turbulence). If the control system 160 determines that a speed error exists, and that it exceeds a predetermined limit, the engine control 140 will control the engine 100 in such a manner that the aircraft gas turbine engine thrust is increased at the predetermined thrust rate limit. The predetermined thrust rate limit may vary, but is selected for the individual engine 100 to ensure that turbine blade rubs are prevented (or at least substantially minimized) during the engine thrust change transients. As may be appreciated, in order to determine if a speed error exists, the avionics system 150, at least in the depicted embodiment, processes aircraft data to determine aircraft speed, and compares the determined aircraft speed to a preset cruise speed.

Conversely, if the control system 160 determines that a change in engine thrust is, or will be, requested by a triggering event, then the turbine blade tip-to-static structure clearance is increased to the predetermined clearance value (414). Although the type and number of triggering events may vary, some non-limiting examples of triggering events include one or more of determining that the aircraft A/T 306 is disengaged, determining that the level flight capability is disengaged, detecting movement of a manual aircraft throttle control, detecting that the altitude setting on the control panel 304 has been changed, detecting that the aircraft speed setting on the control panel 304 has been changed and selected, detecting that the fuel-saving mode 314 has been disabled, and detecting that aircraft speed has varied a predetermined amount (e.g., beyond the predetermined deadband speed). The control system 160 may also be configured to make this determination from the flight plan data. In such embodiments, the avionics system 150 is configured to process the flight plan data to determine when a change in aircraft gas turbine engine thrust will be requested. For example, the flight plan data may indicate that an increase in altitude is going to occur, potentially due to a step climb, that a speed change is going to occur, that a turn is going to occur, and that a deceleration is going to occur, just to name a few non-limiting examples. As with the "minimum" clearance value, the particular turbine blade tip-to-static structure clearance value that corresponds to the predetermined clearance may vary from engine to engine, and under differing operating conditions, and is known to the engine control 140.

As FIG. 4 also depicts, the change in engine thrust that is, or will be, requested by a triggering event, is prevented from being implemented in the engine 100 until the predetermined clearance is achieved (416). To do so, the engine control 140 implements a "limiter" that prevents a thrust change from being implemented in the engine 100 until the predetermined clearance is achieved. The engine control 140 may be variously configured to determine when the predetermined clearance has been achieved. For example, the engine control 140 may receive sensor signals from sensors within the gas turbine engine 100 that sense turbine blade tip-to-static structure clearance, or the engine control 140 may be configured to make this determination based on time and from the previously mentioned model (or other representative data) of the gas turbine engine 100.

After the predetermined turbine blade tip-to-static structure clearance is achieved, the engine control 140 will then implement the requested thrust change (418) and may, in some embodiments, supply a signal representative of this to the avionics system 150. Thereafter, the avionics system 150 again processes the mode control data to determine if the fuel-saving mode is enabled, and various aircraft data to determine if the gas turbine engine 100 is generating a substantially constant thrust. When these criteria are met, the turbine blade tip-to-static structure clearance is once again minimized. Until then, the predetermined turbine blade tip-to-static structure clearance is maintained.

It will be appreciated that in some embodiments the limiter function may be overridden in certain circumstances. For example, in some embodiments it may be desirable to not delay a thrust change, and potentially allow a tip rub to occur, if the pilot manually moves the throttles. This may occur, for example, during a scenario where an immediate change in engine thrust is needed.

The system and method described in this descriptive portion provide for the control of turbine blade clearances so that rubs between turbine blade tips and static structures is eliminated (or at least reduced) as a result of engine thrust level changes when the automatic systems are engaged.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling turbine blade tip-to-static structure clearance in a gas turbine engine installed on an aircraft, comprising the steps of:
   processing mode control data to determine that a fuel-saving mode is enabled;
   processing aircraft data to determine that the aircraft gas turbine engine is generating a constant thrust;
   minimizing the turbine blade tip-to-static structure clearance in the aircraft gas turbine engine to a minimum clearance upon determining that (i) the aircraft gas turbine engine is generating the constant thrust and (ii) the fuel-saving mode is enabled;
   processing the aircraft data to determine (i) aircraft speed and (ii) if a thrust level change is, or will be, requested by a triggering event;
   comparing the determined aircraft speed to a preset cruise speed to generate a speed error;
   changing the aircraft gas turbine engine thrust at a predetermined throttle rate limit when (i) the speed error exceeds a predetermined limit and (ii) the thrust level change is not, or will not be, requested by the triggering event,
   increasing the turbine blade tip-to-static structure clearance in the aircraft gas turbine engine from the minimum clearance to a predetermined clearance when the thrust level change is, or will be, requested by the triggering event; and
   preventing the change in the aircraft gas turbine engine thrust until the predetermined clearance is achieved.

2. The method of claim 1, wherein the aircraft data comprise data that indicates:
   aircraft auto-throttle is engaged;
   level flight capability is engaged; and
   the aircraft is traveling at a constant speed.

3. The method of claim 1, wherein the triggering event comprises one or more of:
   aircraft auto-throttle is disengaged;
   aircraft level flight capability is disengaged;
   movement of a manual aircraft throttle control is detected;
   a change in an altitude window of the aircraft;
   a change in a speed window of the aircraft; and
   the aircraft speed varying a predetermined amount.

4. The method of claim 1, further comprising:
   processing flight plan data to determine that the increase in aircraft gas turbine engine thrust will be requested by the triggering event; and
   increasing the turbine blade tip-to-static structure clearance from the minimum clearance to the predetermined clearance within a predetermined time period of when the increase in the aircraft gas turbine engine thrust will be requested.

5. The method of claim 1, further comprising:
   storing a model of the gas turbine engine; and
   determining the minimum clearance value from the stored engine model.

6. The method of claim 5, further comprising:
   determining response characteristics of the gas turbine engine from the stored engine model.

7. The method of claim 1, wherein the turbine blade tip-to-static structure clearance is increased from the minimum clearance to the predetermined clearance in response to the fuel-saving mode being disabled.

8. A turbine blade tip-to-static structure clearance control system, comprising:
   an aircraft gas turbine engine configured to generate a thrust, the aircraft gas turbine engine comprising a turbine section that includes a plurality of turbine blades surrounded by static structure, each turbine blade having a turbine blade tip that is spaced apart from the static structure by a turbine blade tip-to-static structure clearance; and
   a control system in operable communication with the aircraft gas turbine engine, the control configured to:
   control the turbine blade tip-to-static structure clearance in the aircraft gas turbine engine,
   determine that a fuel-saving mode is enabled,
   determine that the aircraft gas turbine engine is generating a constant thrust,
   minimize the turbine blade tip-to-static structure clearance in the aircraft gas turbine engine to a minimum clearance upon determining that (i) the aircraft gas turbine engine is generating the constant thrust and (ii) the fuel-saving mode is enabled, process aircraft data to determine (i) aircraft speed and (ii) if a thrust level change is, or will be, requested by a triggering event, compare the determined aircraft speed to a preset cruise speed to generate a speed error, change the aircraft gas turbine engine thrust at a predetermined throttle rate limit when (i) the speed error exceeds a predetermined limit and (ii) the thrust level change is not, or will not be, requested by the triggering event, increase the turbine blade tip-to-static structure clearance in the aircraft gas turbine engine from the minimum clearance to a predetermined clearance when the thrust level change is, or will be, requested by the triggering event, and prevent the change in the aircraft gas turbine engine thrust until the predetermined clearance is achieved.

9. The system of claim 8, wherein the aircraft data comprise data that indicates:

aircraft auto-throttle is engaged;
aircraft level flight capability is engaged; and
the aircraft is traveling at a constant speed.

10. The system of claim 8, wherein:

the control system has a model of the gas turbine engine stored therein; and
the control system is further configured to determine the minimum clearance value from the stored engine model.

11. The system of claim 10, wherein the control system is further configured to determine response characteristics of the engine from the stored engine model.

12. The system of claim 8, wherein the triggering event comprises one or more of:

aircraft auto-throttle is disengaged;
aircraft level flight capability is disengaged;
movement of a manual aircraft throttle control is detected;
a change in an altitude window of the aircraft;
a change in a speed window of the aircraft; and
the aircraft speed varying a predetermined amount.

13. The system of claim 8, wherein the control system is further configured to:

process flight plan data to determine when the increase in aircraft gas turbine engine thrust will be requested by the triggering event; and
increase the turbine blade tip-to-static structure clearance from the minimum clearance to the predetermined clearance within a predetermined time period of when the increase in aircraft gas turbine engine thrust will be requested.

14. The system of claim 8, wherein the control system is further configured to detect that the fuel-saving mode is disabled and, in response thereto, to increase the turbine blade tip-to-static structure clearance from the minimum clearance to the predetermined clearance.

* * * * *